(12) United States Patent
Culbertson et al.

(10) Patent No.: US 7,634,575 B2
(45) Date of Patent: Dec. 15, 2009

(54) METHOD AND SYSTEM FOR CLUSTERING DATA STREAMS FOR A VIRTUAL ENVIRONMENT

(75) Inventors: W. Bruce Culbertson, Palo Alto, CA (US); John Apostolopoulos, Palo Alto, CA (US); Nina Bhatti, Mountain View, CA (US); Daniel G. Gelb, Redwood City, CA (US); Michael E. Goss, Burlingame, CA (US); Thomas Malzbender, Palo Alto, CA (US); Kei Yuasa, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 994 days.

(21) Appl. No.: 10/684,033

(22) Filed: Oct. 9, 2003

(65) Prior Publication Data
US 2005/0080900 A1  Apr. 14, 2005

(51) Int. Cl.
*G06F 15/16* (2006.01)
(52) U.S. Cl. .................................................. 709/231
(58) Field of Classification Search ................ 709/204, 709/205, 231, 226; 348/14.01–14.16; 375/240.01
See application file for complete search history.

(56) References Cited

U.S. PATENT DOCUMENTS

| | | | | |
|---|---|---|---|---|
| 5,896,128 A | * | 4/1999 | Boyer ........................ 715/716 |
| 6,128,649 A | * | 10/2000 | Smith et al. .................. 709/217 |
| 6,219,704 B1 | | 4/2001 | Kim et al. |
| 6,414,707 B1 | * | 7/2002 | Agraharam et al. ....... 348/14.07 |
| 6,583,808 B2 | * | 6/2003 | Boulanger et al. ........ 348/14.09 |
| 6,757,005 B1 | * | 6/2004 | Elbaz et al. ............. 348/14.09 |
| 6,816,904 B1 | * | 11/2004 | Ludwig et al. .............. 709/226 |
| 7,133,896 B2 | * | 11/2006 | Ogdon et al. ............... 709/205 |
| 2002/0095493 A1 | | 7/2002 | Byrnes |
| 2002/0143972 A1 | | 10/2002 | Christopoulos et al. |
| 2004/0003040 A1 | | 1/2004 | Beavers et al. |
| 2004/0064504 A1 | * | 4/2004 | Domschitz .................. 709/203 |
| 2004/0128350 A1 | | 7/2004 | Topfl et al. |
| 2004/0190502 A1 | | 9/2004 | Sharma |

* cited by examiner

*Primary Examiner*—Frantz B Jean

(57) ABSTRACT

A method for clustering data streams. Specifically, one embodiment of the present invention discloses a method for clustering data streams for use in a virtual environment. The embodiment of the method begins by determining a cluster of receiving nodes in the virtual environment. Each of the cluster of receiving nodes have associated values for at least one clustering parameter that as a set satisfies a test. Then, the embodiment continues by generating a common data stream based on the clustering parameter. Thereafter, the embodiment sends the common data stream from a sending node to the cluster of receiving nodes.

31 Claims, 9 Drawing Sheets

200

Start

↓

Determining A Cluster Of Receiving Nodes In A Virtual Environment, Wherein Each of the Cluster Of Receiving Nodes Have Associated Values for at Least One Clustering Parameter That As a Set Satisfies a Test
210

↓

Generating A Common Data Stream Based On The Clustering Parameter
220

↓

Sending The Common Data Stream From A Sending Node To The Cluster Of Receiving Nodes
230

↓

End

Start

Determining A Cluster Of Receiving Nodes Among A Plurality Of Receiving Nodes, Wherein A Plurality Of Varying Data Streams Are Generated By A Sending Node For All of the Plurality of Receiving Nodes Depending On An Associated Value Of A Parameter For All Of The Plurality Of Receiving Nodes, And Wherein Each Of The Cluster Of Receiving Nodes Have Associated Values For The Parameter That As A Set Satisfies A Test Such That Data Streams Associated With The Cluster of Receiving Nodes Are Substantially Similar
710

Generating A Common Data Stream Of A Sending Object Associated With The Sending Node Based On A Representative Value Of The Parameter
720

Sending The Common Data Stream To The Cluster Of Receiving Nodes
730

End

FIG. 7

METHOD AND SYSTEM FOR CLUSTERING DATA STREAMS FOR A VIRTUAL ENVIRONMENT

RELATED UNITED STATES PATENT APPLICATION

This Application is related to U.S. patent application Ser. No. 10/176,494 by Thomas Malzbender et al., filed on Jun. 21, 2002, entitled "Method and System for Real-Time Video Communication Within a Virtual Environment", and assigned to the assignee of the present invention.

TECHNICAL FIELD

The present invention relates to the field of a multi-user virtual environment, and more particularly to a method for enabling clustering data transfer within the multi-user virtual environment.

BACKGROUND ART

A communication network to support a virtual environment supporting N participants can be quite complex. In a virtual environment supporting N participants, there are N nodes within the communication network. For a full richness of communication, each node that represents a participant may generate a different data stream to send to each of the other nodes. There is a computational cost associated with producing each data stream. In addition, there is a communication cost associated with transmitting data streams between the nodes.

As the number N of participants grows, computational and communication bandwidth complexities increase in order to support the increasing number of participants. As such, maintaining scalability of the communication network as the number N increases becomes more important. For example, in the case where a different data stream is sent to each of the other participants, the local computer must generate and transmit N−1 data streams, one for each of the other participants. At the local level, computational complexity scales with the number of participants. As such, as the number N of participants increases, the computational capacity of the local computer may be exceeded depending on the processing power capabilities of the local computer. As such, the amount of computation will become prohibitive as N grows.

At the network level, when each of the N participants are generating a separate data stream for each of the other participants, this leads to a total of N(N−1) data streams that are transmitted over the entire communication network. Both at the local and network levels, the amount of communication transmitted over the network may exceed the network's capabilities as N grows. As such, the amount of communication will become prohibitive as N grows.

What is needed is a reduction in both computational complexity and communication traffic under certain tests. As such, immersive communication systems will be able to scale to larger values of N.

DISCLOSURE OF THE INVENTION

A method for clustering data streams. Specifically, one embodiment of the present invention discloses a method for clustering data streams for use in a virtual environment. The embodiment of the method begins by determining a cluster of receiving nodes in the virtual environment. Each of the cluster of receiving nodes have associated values for at least one clustering parameter that as a set satisfies a test. Then, the embodiment continues by generating a common data stream based on the clustering parameter. Thereafter, the embodiment sends the common data stream from a sending node to the cluster of receiving nodes.

BRIEF DESCRIPTION OF THE DRAWINGS

FIG. 2 is a flow chart illustrating steps in a computer implemented method for clustering data streams that have a shared clustering parameter for a virtual environment, in accordance with one embodiment of the present invention.

FIG. 7 is a flow chart illustrating steps in a computer implemented method for clustering data streams that are associated with parameters that satisfies a test for a virtual environment, in accordance with one embodiment of the present invention.

BEST MODES FOR CARRYING OUT THE INVENTION

Reference will now be made in detail to the preferred embodiments of the present invention, a method of clustering data streams. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments of the present invention can be implemented on software running on a computer system. The computer system can be a personal computer, notebook computer, server computer, mainframe, networked computer, handheld computer, personal digital assistant, workstation, and the like.

This software program is operable for providing clustering of data streams. In one embodiment, the computer system includes a processor coupled to a bus and memory storage coupled to the bus. The memory storage can be volatile or non-volatile and can include removable storage media. The computer can also include a display, provision for data input and output, etc.

Accordingly, the present invention provides a method and system for clustering data streams. As a result, embodiments of the present invention are capable of reducing both computational complexity and communication traffic. As such, immersive communication systems will be able to scale to higher numbers of participants.

Figure 1A:
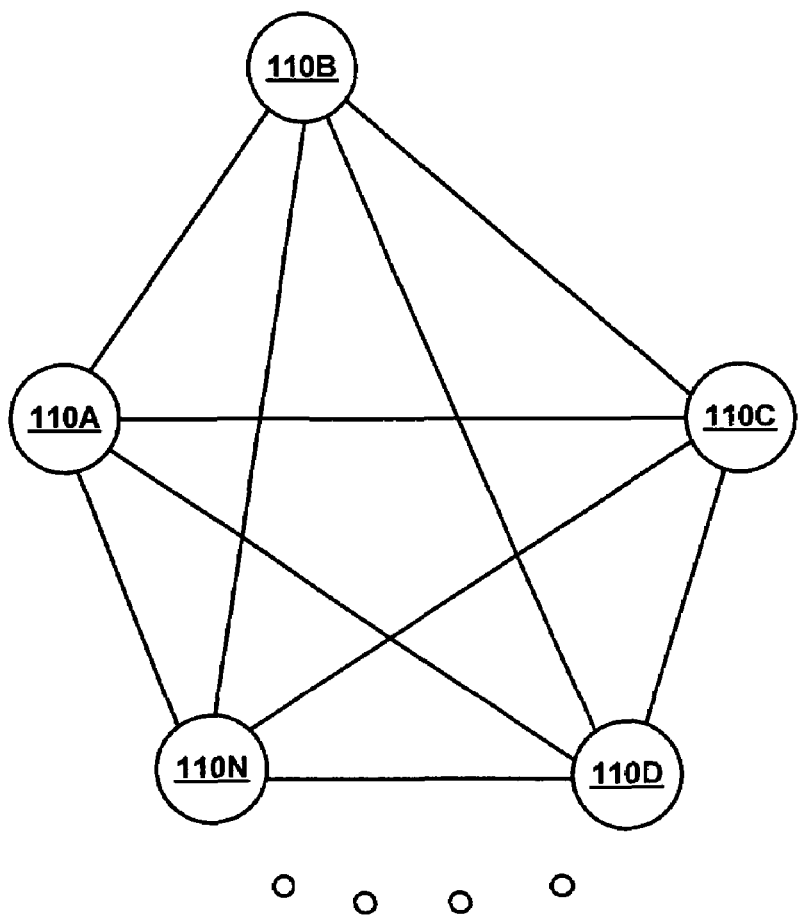
FIG. 1A is a diagram of an exemplary communication network for facilitating communication within an N-way collaborative environment, in accordance with one embodiment of the present invention.

FIG. 1A is a diagram of the communication paths within a communication network 100A that is capable of supporting an N-way collaborative virtual environment, in accordance with one embodiment of the present invention. For purposes of clarity, the actual physical routing through routers and switches through the communication network 100A is not shown. Embodiments of the present invention are well suited to application within a class of communication systems that allow multiple numbers of users or participants to interact in a collaborative virtual environment, the N-way collaborative virtual environment.

The communication network 100A comprises N nodes, as follows: node 110A, node 110B, node 110C, node 110D, on up to node 110N. In FIG. 1A, at least two communication paths are set up between one sending participant and two receiving participants to achieve the benefits derived from clustering data streams. A participant is associated with each of the nodes in the communication network 100. Each of the participants at each node interacts with the remaining participants through the representation of the communication network 100A in order to participate within the N-way collaborative virtual environment. For example, the participant at node 110A communicates with the remaining participants (participants at nodes 1110B-N) through the communication network 100A.

The nodes within the communication network 100A can produce data streams for some or all of the other nodes within the communication network 100A. In all embodiments in which this invention applies, the data streams are user dependent. That is, a sending participant sends potentially different data streams to each of the other receiving participants. As such, the data stream that is generated by the sending participant is dependent upon to which receiving participant is receiving the data stream. In one embodiment, the user dependency is defined by a user's viewpoint. In that case, the data streams are generated on a view dependent basis.

Figure 1B:
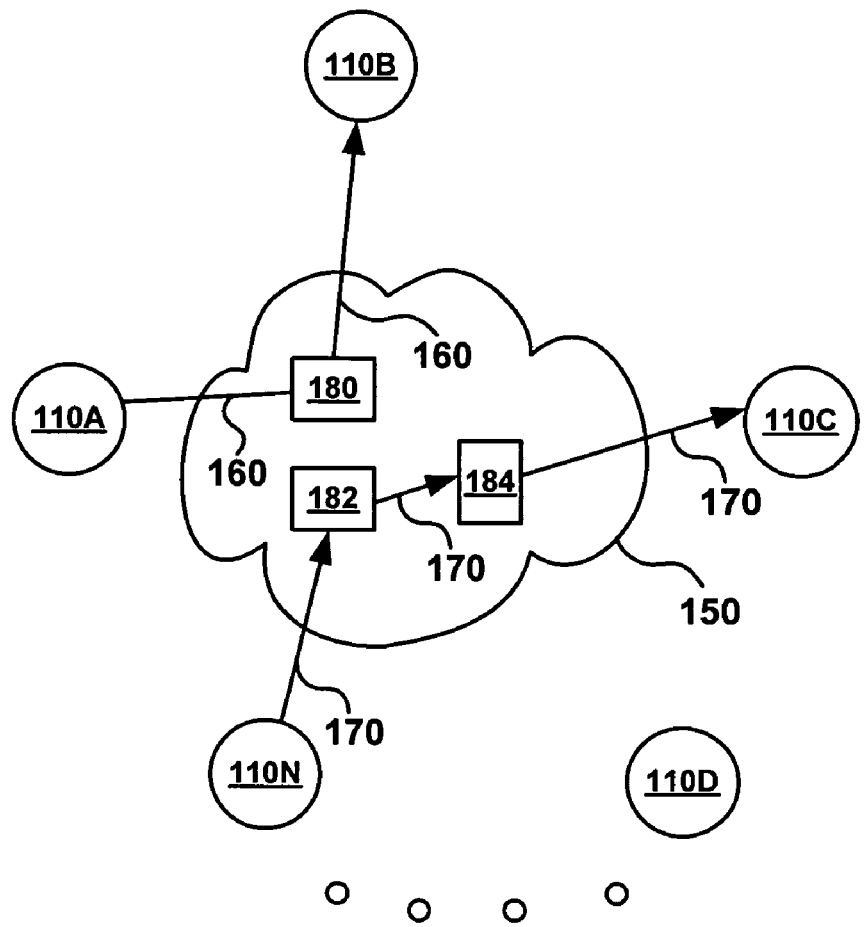
FIG. 1B is a physical representation of communication paths within the communication network of FIG. 1A, in accordance with one embodiment of the present invention.

FIG. 1B is a diagram illustrating the physical communication network 100B that supports an N-way collaborative environment, in accordance with one embodiment of the present invention. FIGS. 1A and 1B illustrate the transparent nature of the underlying network 150 that supports the N-way collaborative virtual environment. As shown in FIG. 1B, the participants 110A-N communicate through a network 150 (e.g., the Internet). Within the network 150, communication traffic is transmitted through various devices 180, 182, and 184, such as, routers and/or switches. For illustrative purposes only, participant 110A sends a data stream to participant 110B through device 180 over communication path 160. Also, participant 110N sends a data stream to participant 110C through devices 182 and 184 over communication path 170. In that way, each of the participants can communicate with the other participants through the underlying network 150.

With increasing N, the computational cost associated with producing each distinct stream increases. In addition, the communication cost for transmitting the data streams to each of the nodes within the communication network 100 increases. Embodiments of the present invention are capable of reducing the overall computational costs as well as the volume and cost of communication traffic through the network allowing the communication network 100 to scale to larger values of N.

While embodiments of the present invention are disclosed for clustering video data streams, other embodiments are well suited to clustering data streams in a virtual environment, such as, an N-way collaborative environment.

As previously stated, in one embodiment, an N-way collaborative environment comprises a three-dimensional virtual environment. Images in real-time of a sending object (e.g., a sending participant) associated with a sending node are generated from the viewpoints of representations of receiving nodes (e.g., receiving participants) within the virtual N-way collaborative environment. The images are generated by new view synthesis techniques based on sample video streams of the sending object.

Construction of each of the (N−1) new views of a sending object is done with various new view synthesis techniques. The new view synthesis techniques construct, from the various real-time video streams of the sending object taken from the multiple sample perspectives, a new view taken from a new and arbitrary perspective, such as, the perspective of a representation of a receiving node in the virtual environment.

An intermediate step includes rendering a three dimensional model of the sending object, from which the new view of the sending object is generated. The three-dimensional model is generated from the various real-time video streams of the sending object. For example, the 3D model is constructed from synchronous video frames taken from multiple sample camera perspectives. The 3D model forms the basis for creating avatars representing the sending object in the N-way collaborative environment. Renderings of a object's avatar from the perspective of other representations of receiving nodes in the virtual environment are generated. As a result, the images of the avatars are sent to the receiving nodes. The activity between the nodes participating in the N-way collaborative environment is highly interactive.

In other embodiments, an image based visual hull (IBVH) technique is used to render the three dimensional model of the sending object from the perspective of representations of receiving nodes in the virtual environment. For example, the IBVH technique back projects the contour silhouettes into a three-dimensional space and computes the intersection of the resulting frusta. The intersection, the visual hull, approximates the geometry of the object. Rendering this geometry with view-dependent texture mapping creates convincing new views.

In other embodiments, other reconstruction techniques instead of IBVH and image-based polygonal reconstruction techniques are used to render a three dimensional model of the sending object from the perspective of representations of receiving nodes in the virtual environment.

Processing can be accomplished at the local computer associated with the sending node or any suitable intermediate location within the network. As a result, the rendered images and opacity maps are transmitted to all participants. That is, the outputs are rendered with the three dimensional virtual environment model to provide for photo-realistic versions of the sending object associated with the sending node within the virtual environment. The virtual environment also includes photo-realistic versions of other participants. The N-way collaborative environment is viewed by all participants from the perspectives of their corresponding avatars within the virtual environment.

While embodiments of the present invention are described within the context of an N-way collaborative environment (e.g., an N-way video conference), other embodiments are well suited to other environments (e.g., video gaming) that provide for interaction between multiple participants within virtual environments.

In one embodiment, the data streams are clustered to support communication within a virtual environment. The virtual environment supports interactive communication between N participants. In another embodiment, an N-way collaborative environment comprises a three-dimensional virtual environment. Participants in the virtual environment generate user dependent data streams that are sent to the other participants. That is data streams are generated at a sending node associated with a sending participant based on which receiving node is receiving the data stream.

FIG. 2 is a flow chart 200 of a method for clustering data streams for a virtual environment, in accordance with one embodiment of the present invention. In general, if two data streams (e.g., video streams) are similar, they are collapsed into one stream. This saves computational processes needed to generate the data streams. The virtual environment supports interactive communication between N participants.

In one embodiment, the virtual environment comprises a three-dimensional N-way collaborative environment. Participants in the virtual environment generate user dependent data streams that are sent to the other participants. That is data streams are generated at a sending participant based on which participant is receiving the data stream.

In one embodiment, clustering is a function of time, or time varying. As such, participants and their corresponding computing nodes can enter or leave an N-way collaborative environment at any point in time. This changes the set of participants within the N-way collaborative environment, from which clusters can be formed. Furthermore, the participants can change their clustering parameters (e.g., viewpoint) through time. The clustering parameter determines the data stream that is sent to an associated receiving node. That is, when the participants change their parameters the degree of similarity between the data streams is affected. Correspondingly, the decision changes on which receiving participants are clustered together. As a result, computational requirements would change if the cluster of receiving participants have changed.

In another embodiment, the cluster of receiving nodes is determined dynamically. That is, the allocation of resources is dynamically adjusted at the sending node. In this case, computational resources at both network and local levels are taken into account on a continual and dynamic basis. That is, the present embodiment takes into account the change in the availability of resources at the sending node and throughout the network. For example, at the local node, compute resources at the sending node may increase as a result of removing data streams for participants that have left the communication session. As a result, compute resources can be increased at the local, sending node allowing for richer data streams to be computed from the sending node, and thereby decreasing the need to cluster receiving nodes for computational efficiency. At the network level, network conditions may change that affects the ability of the sending node to meet quality of service (QoS) requirements. As a result, the sending node may choose to increase or decrease the quality of the data streams depending on the network capabilities.

The present embodiment of FIG. 2 begins by determining a cluster of receiving nodes in a virtual environment, at 210. The receiving nodes are associated with receiving participants, and computing devices that are used by the participants to interact within the virtual environment.

Each of the cluster of receiving nodes have associated values for at least one clustering parameter. The associated values as a set satisfies a test. That is, the set of values for the clustering parameter for each of the cluster of receiving nodes satisfies the test. The clustering parameter determines the data stream that is sent to the receiving node, and as such, the data streams are user dependent. For example, embodiments of the present invention describe clustering parameters that comprises viewpoint, temporal and spatial parameters, as will be fully described below. In general, clustering parameters allow for the clustering of data streams to reduce computational processing and communication traffic.

For purposes of the present Application, the term "substantially similar," as used herein is intended to mean the following. Independent data streams for each of the cluster of receiving nodes are substantially similar when a common data stream can be generated that can be substituted for the independent data streams generated for each of the cluster of receiving nodes, such that sufficient information from the common data stream would still be imparted to each of the receiving nodes to impart to each of the receiving nodes the general scope of the information as if they would have received it from the independent data streams.

For example, in a viewpoint case, where the parameter in question is viewpoint, the common data stream would give a viewpoint that is substantially similar to the independently received viewpoint such that the general scope of viewpoint information is not lost when using the common data stream. That is, information of a common viewpoint would be similar to information of an independently received viewpoint, such that the general scope of information is not lost when using the common viewpoint for the common data stream.

Similarly, in a resolution case, where the parameter in question is resolution, the common data stream would have a resolution that is substantially similar to the independently received resolution such that the general scope of resolution information is not lost when using the common data stream. That is, information of a common resolution would be similar to information of an independently received resolution, such that the general scope of information is not lost when using the common resolution for the common data stream.

In another embodiment, for multiple clustering parameter dependency, if the cluster of receiving nodes is defined by more than one clustering parameter, the set of values for all the clustering parameters satisfies the test. For example, multiple clustering parameters can include viewpoint of a receiving participant, and frame rate. Both of these clustering parameters are used for deciding which data streams for receiving nodes are combined. In one case, if values for both sets of clustering parameters are substantially similar, then the streams of data can be shared.

At 220, the present embodiment generates a common data stream that is based on the clustering parameter, or group of clustering parameters that as a set satisfies the test. In one embodiment, the common data stream is generated from an average of the clustering parameters associated with the cluster of receiving participants. In another embodiment, the common data stream is generated from a median of the clustering parameters. This minimizes errors when presenting a common data stream as a user dependent data stream for each of the cluster of receiving participants.

For example, within an N-way collaborative video environment, where the clustering parameter comprises a view dependent clustering parameter, the present embodiment can generate a common video image stream of the sending participant using a new view synthesis technique. In one embodiment, the common video image stream represents a view of the sending participant generated from a common viewpoint or perspective associated with the cluster of receiving participants.

At 230, the present embodiment sends the common data stream from the sending node to each of the cluster of receiving nodes. By clustering the receiving nodes and generating a common data stream, computational savings at the sending node is realized. That is, rather than generating multiple user dependent data streams that are particular to each receiving node, one common data stream is generated that is based on a common value of the clustering parameter. The common data stream approximates the user dependent data streams that would have been generated for each of the receiving nodes.

In addition, communication savings are realized over a communication network with the implementation of multicasting, as will be further described below. In general, the transmission of the common data stream is multicast to the cluster of receiving participants, rather than sending duplicate common data stream to each of the cluster of receiving participants through the communication network.

Figure 6A:
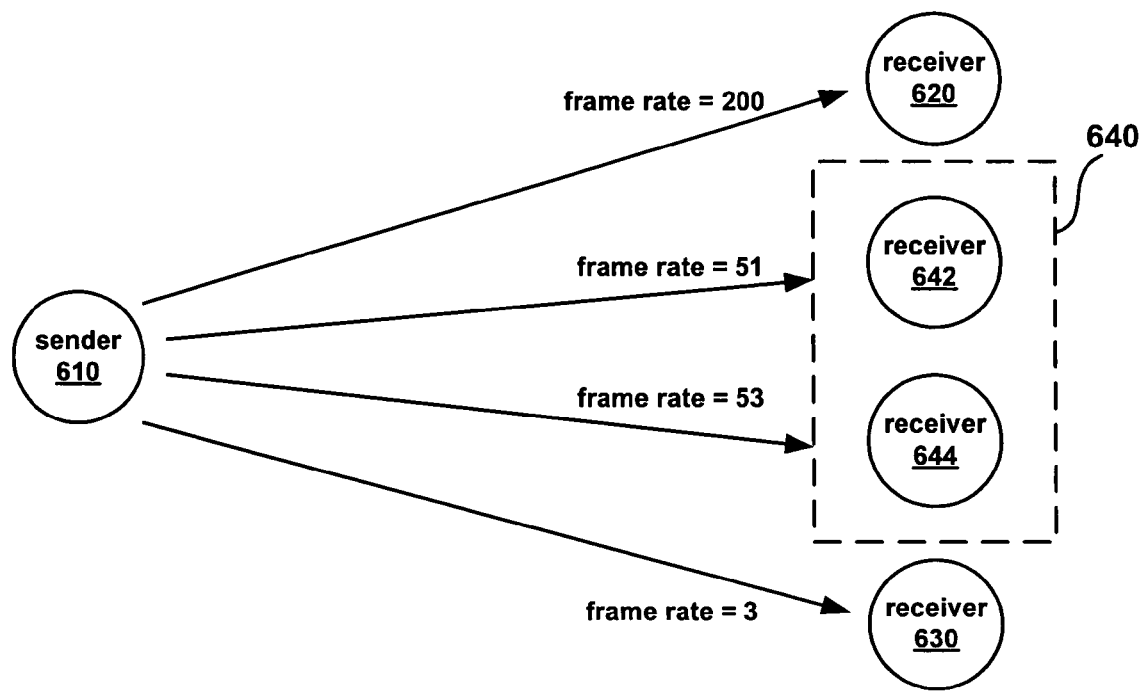
FIG. 6A is a diagram illustrating a shared frame rate clustering parameter, in accordance with one embodiment of the present invention.

In FIG. 6A, a diagram 600 illustrates the data streams that a sending node 610 is transmitting to a plurality of receiving nodes. The plurality of receiving nodes comprises receiving nodes 620, 630, 642, and 644. In the present case, the clustering parameter is "frame rate." That is, in one embodiment, the receiving nodes are said to have values for the frame rate clustering parameter that as a set satisfies a test when values for the frame rate clustering parameter for each of the cluster of receiving nodes 620 are within 10 of each other. As such, in the present case, receiving nodes 642 and 644 comprise a cluster of receiving nodes 640.

Figure 6B:
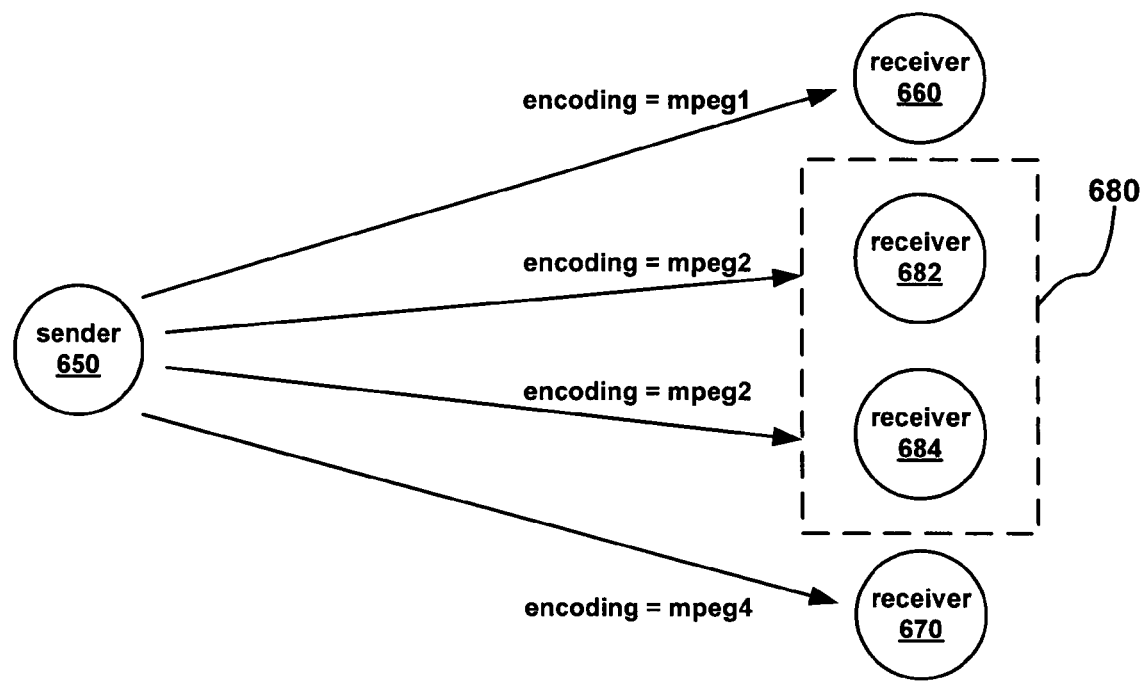
FIG. 6B is a diagram illustrating a shared encoding clustering parameter, in accordance with one embodiment of the present invention.

In FIG. 6B, a diagram 600B illustrates the data streams that a sending node 650 is transmitting to a plurality of receiving nodes. The plurality of receiving nodes comprises receiving nodes 660, 670, 682, and 684. In the present case, the clustering parameter is "encoding." That is, in one embodiment, the receiving nodes have values for encoding clustering parameters that as a set satisfy the test when encoding formats are identical. In the present case, receiving nodes 682 and 684 comprise a cluster of receiving nodes 680.

FIG. 7 is a flow chart 700 of a method for clustering data streams, in accordance with one embodiment of the present invention. In general, if two data streams (e.g., video streams) are similar, they are collapsed into one stream. This saves computational processes needed to generate the data streams.

The present embodiment of FIG. 7 begins by determining a cluster of receiving nodes among a plurality of receiving nodes. Varying data streams are generated by a sending node for the plurality of receiving nodes. The data streams vary depending on an associated value of a parameter for each of the plurality of receiving nodes.

Also, the cluster of receiving nodes have associated values for the parameter that as a set satisfies a test. Further, because the set satisfies the test, the data streams associated with the cluster of receiving nodes are substantially similar.

The value of the of a receiving node's parameter defines the data stream that the receiving node receives. For example, embodiments of the present invention describe parameters that comprise viewpoint, temporal and spatial parameters, as will be fully described below. In general, parameters allow for the clustering of data streams to reduce computational processing and communication traffic.

In one embodiment, the parameter comprises a view dependent parameter. View dependency dictates what data streams are generated and sent from an associated sending node depending on the perspectives of virtual representations associated with receiving nodes within a virtual environment, as described previously. That is, the view dependent parameter defines an associated perspective of a virtual representation of a receiving node within the virtual environment.

Furthermore, to satisfy the test, virtual representations associated with each of the cluster of receiving nodes are spatially located in the virtual environment, such that, their respective perspectives are similar. As a result, data streams associated with the cluster of receiving nodes are similar.

In another embodiment, a cluster of receiving nodes have associated values for a set of parameters, wherein the set of parameters satisfies a test. That is, the input to the test is the set of parameter values that is tested collectively. The output of the test is a measure of the similarity of the associated data streams. Specifically, if a set of parameter values satisfies the test, then the associated data streams are so similar that they can be replaced with a single stream. For example, a set of parameters can include viewpoint of a receiving participant, and frame rate. Both of these parameters are used for deciding which data streams for receiving participants are combined.

At 720, the present embodiment generates a common data stream that is based on a representative value of the values of the parameter that as a set satisfies the test, or correspondingly, representative values for the group of parameters that as a set is tested. In one embodiment, the common data stream is of a sending object that is associated with the sending node.

In one embodiment, the common data stream is generated from an average of the associated values of the parameter that is associated with the cluster of receiving nodes. In another embodiment, the common data stream is generated from a median of the associated values of the parameter. This minimizes errors when presenting a common data stream to each of the cluster of receiving nodes.

For example, within an N-way collaborative video environment, where the parameter comprises a view dependent parameter, the present embodiment can generate a common video image stream of the sending object using a new view synthesis technique. In one embodiment, the common video image stream represents a view of the sending object generated from an average or median viewpoint or perspective associated with virtual representations associated with the cluster of receiving nodes. That is, the common data stream is generated for each of the receiving participants within an acceptable boundary of error, such that, the common data stream is identical or similar to data streams that would have been generated for associated parameters associated with the cluster of receiving nodes.

At 730, the present embodiment sends the common data stream from the sending node to each of the cluster of receiving nodes. By clustering the receiving nodes and generating a common data stream, computational savings at the sending node is realized. That is, rather than generating multiple data streams that are dependent on associated values that are particular to each receiving node, one common data stream is generated that based on a representative value for the parameter. The common data stream approximates the data streams that would have been generated for each of the receiving nodes.

In addition, communication savings are realized over a communication network with the implementation of multicasting, as will be further described below. In general, the transmission of the common data stream is multicast to the cluster of receiving nodes, rather than sending duplicate common data stream to each of the cluster of receiving nodes through the communication network.

In one embodiment, the clustering parameter (or parameter for satisfying a test) comprises a view dependent clustering parameter. View dependency dictates what the receiving node is viewing the three-dimensional virtual environment depending on the perspective of the receiving node within the virtual environment, as described previously. If a set of participants receiving view dependant data streams have similar perspectives, then they would receive nearly identical data streams. To save computation and communication, the participants can be declared to be a cluster and sent exactly identical data streams.

Figure 3:
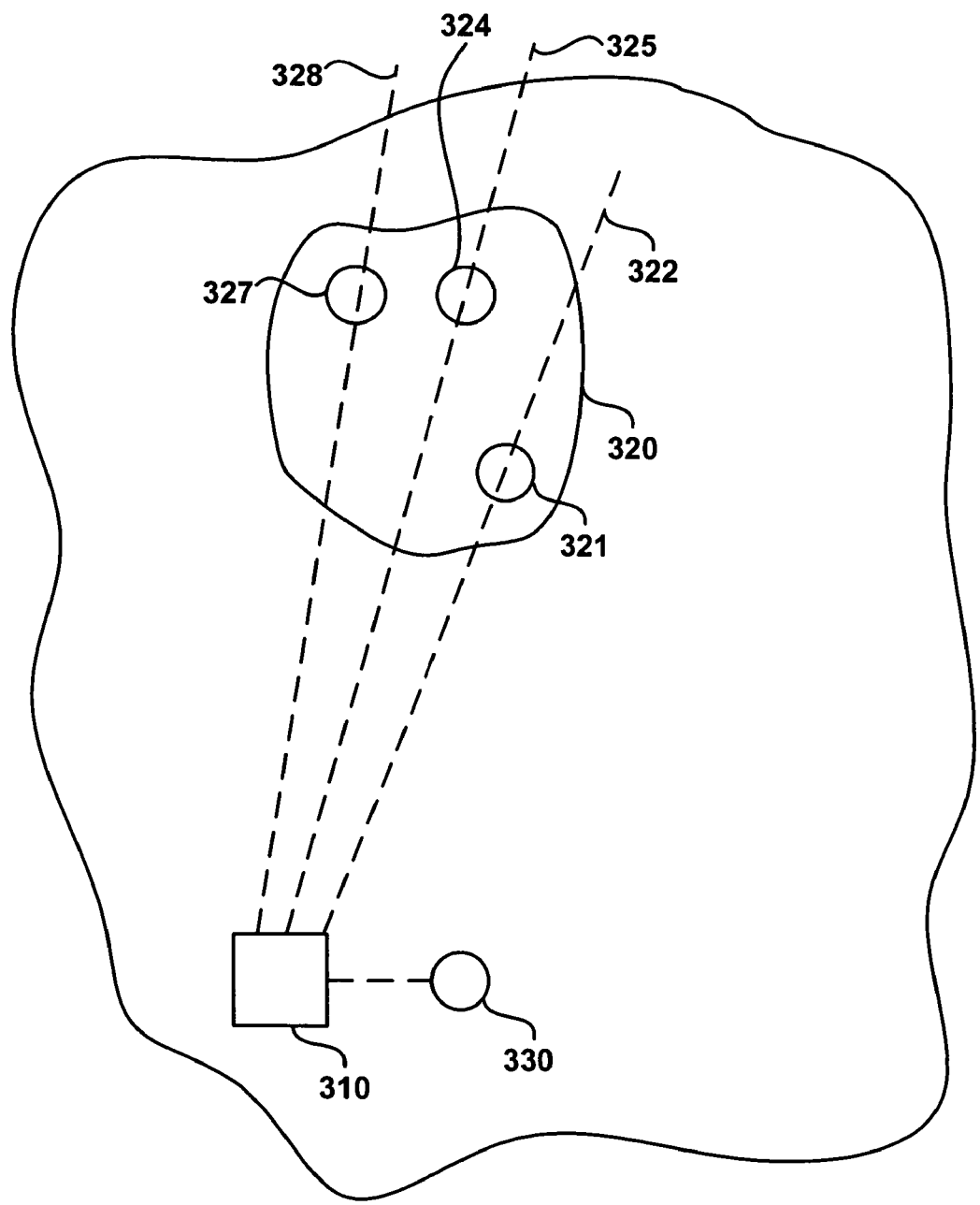
FIG. 3 is a diagram of a virtual N-way collaborative network illustrating a view dependent clustering parameter, in accordance with one embodiment of the present invention.

FIG. 3 is a diagram illustrating a parameter, or clustering parameter, that comprises a view dependant parameter (e.g., viewpoint or perspective), in accordance with one embodiment of the present invention. FIG. 3 illustrates four participants located within a virtual environment 300 for an N-way collaborative session or environment. The participants include a sending participant 310. For purposes of discussion, views of the sending participant are generated and sent to the receiving participants. The views of the sending participant are generated from the perspectives of the other receiving participants. The receiving participants that are viewing the sending participant include receiving participants 321, 324, 327 and 330.

In one embodiment, a video communication system comprises a computer associated with the sending participant 310 that generates a separate rendering of the sending participant 310 for each of the receiving participants. The renderings correspond to perspectives of the sending participant 310 from each of the receiving participant's viewpoint. As can be seen, four different renderings of the sending participant need to be generated for the receiving participants (321, 324, 327, and 330).

For those receiving participants viewing the sending participant 310 from similar perspectives, the same rendering of the sending participant 310 can be computed and transmitted. As such, rather than multiple renderings being generated for receiving participants with similar perspectives, a common rendering of the sending participant is generated and sent to each of the receiving participants with similar perspectives.

Receiving participants with similar perspectives occur for receiving participants that are spatially located in the virtual environment 300, such that their respective perspectives are similar resulting in a viewpoint clustering parameter that satisfies a test associated with the similar perspectives, in one embodiment. For example, the cluster 320 of receiving participants include three receiving participants. The perspectives associated with each of the cluster 320 of receiving participants of the sending participant within the virtual environment 300 are represented by the dotted lines connecting each of the cluster 320 of receiving participants to the sending participant. The perspectives are representative of the viewpoints of each of the receiving participants when viewing the sending participant 310 within the virtual environment 300. For example, line 322 illustrates the direction of the center of the viewpoint of the receiving participant 321 within the virtual environment 300. Also, line 325 illustrates the direction of the center of the viewpoint of the receiving participant 324 within the virtual environment 300. Additionally, line 328 illustrates the direction of the center of the viewpoint of the receiving participant 327 within the virtual environment 300.

Moreover, the further away from the sending participant the cluster 320 of receiving participants, the better the chance the perspectives will be similar. That is, as the cluster of receiving participants moves further away from the sending participant 310 within the virtual environment 300, the larger the virtual geographic area that encompasses similar perspectives becomes. As such, the cluster 320 of receiving participants comprises three receiving participants that have similar perspectives of the sending participant. That is, each of the cluster receiving participants view a similar image of the sending participant 310 within the virtual environment 300.

As a result, one common video image stream is rendered for all of the cluster of receiving participants 320, in one embodiment. As described previously, the common video image stream is generated from a common perspective of the cluster of receiving participants (e.g., an average, median, etc. perspective).

Different levels of clustering are possible depending on the representation that is streamed to the other receiving participants. For example, in a completely view-independent representation, such as, when a geometric 3D model with view-independent textures is generated, a common geometric data stream can be transmitted to the other receiving participants regardless of their view direction. In that case, the receiving participants can be clustered together regardless of view direction, or even spatial proximity to each other, since the transmitted 3D model is the same.

In another embodiment, if a two-dimensional (2D) image with alpha information is transmitted, then receiving participants must have very similar views for view clustering to be effective since correcting the 2D image to generate other perspectives is problematic. Moreover, for a representation, such as, 2D images, with per pixel depth information, view clustering is useful. In this case, representations can be transformed using image warping to generate views for similar perspectives. As a result similar perspectives are clustered together to reduce computational processing and communication traffic, or bandwidth.

In another embodiment, the parameter that is used for determining clustering of data streams comprises a temporal parameter, that is a function of time. The temporal parameter is related to data quality. In one embodiment, the temporal parameter is related to a frame rate of the video image stream that is being transmitted to each of the receiving nodes. As such, the quality of the video stream is a function of the frame rate. Thus, the frame rate can be adjusted to produce the required quality. As such, the temporal parameter describes a situation wherein the video image streams are made identical for each of a cluster of receiving nodes that require substantially the same frame rate. In addition, because the quality requirements are similar, the receiving nodes will be assigned similar frame rate values. Since the frame rate values are similar, a cluster can be formed.

In another embodiment, the quality of images of the sending object or participant that is associated with a sending node that are sent to the receiving nodes is a function of the distance between virtual representations of the participants in the virtual environment. For example, in FIG. 3, renderings of the sending participant 310 that are produced for receiving participants that are close to the sending participant 310 in the virtual environment 300 will occupy a larger screen area at the display's of the receiving participants. This is because the sending participant is close to the receiving participant in the virtual environment 300. As such, renderings of the sending participant 310 produced for receiving participants that are far from the sending participant will occupy a smaller screen area. In addition, it is also more likely that the sending participant 310 will be engaged in conversation with those receiving participants that are nearby in the virtual environment 300.

For these reasons, the image quality of the sending participant 310 associated with the sending node should be higher for receiving nodes that are closer to the sending participant 310 in the virtual environment 300. For example, the video image stream generated for the receiving participant 330 of FIG. 3 would require a much higher image quality than the common video image stream generated for the cluster 320 of receiving participants, especially if the cluster 320 is located very far from the sending participant 310 in the virtual environment 300. As such, the frame rate of receiving participants that are close to the sending participant in the virtual environment is increased.

Correspondingly, the image quality can be allowed to degrade somewhat for those receiving participants that are located further away. That is, the frame rate is decreased as receiving participants are or go further away from the sending participant in the virtual environment. In this manner computational expense in the rendering process, and potentially the modeling process is achieved by decreasing the frame rate of a rendering of the sending participant 310 that is produced for receiving participants that are located far from the sending participant in the virtual environment 300.

As a result, if multiple receiving participants require approximately the same frame rate and also have similar requirements among other parameters (e.g., viewpoint parameter), then a cluster of receiving participants can be defined as a form of clustering in the time axis, wherein the cluster of receiving participants can share the same video image stream having the same frame rate.

In another embodiment, the parameter, or clustering parameter, comprises a spatial parameter. In this case, each of the cluster of receiving participants require substantially the same resolution, such that their respective data quality requirements are similar. There are a number of reasons to render a sending participant at less than the maximum possible resolution. The reasons given for the user dependent temporal parameter are equally applicable in the spatial parameter. That is, a higher resolution of the sending participant is required for receiving participants that are closer to the sending participant. For instance, rendering quality for receiving participants who are distant in the virtual environment can be lower than that produced for closer receiving participants. In this case, the importance of the sending participant to the receiving participant, or cluster of receiving participants, is based on a distance between the sending participant and the receiving participant in the virtual environment, as previously discussed. Besides dropping the frame rate for distant participants, the present embodiment is capable of computing renderings of the sending participant at a lower resolution for the distant receiving participant. This is natural, since the sending participant appears smaller on the receiving participants display.

The resolution of the sending or local participant is adapted based on his or her importance to a receiving participant in the virtual collaborative environment. As a result, the resolution is increased as the sending participant becomes more important to a receiving participant in the virtual collaborative environment. Also, the resolution is decreased as the sending participant becomes less important to a receiving participant in the virtual collaborative environment.

In one embodiment, valuing an importance of the sending participant is based on whether the receiving participant is gazing at the sending participant in the virtual environment. For instance, the physical gaze of the receiving participant is tracked. As such, a sending participant's importance could be judged to be higher if the receiving participant is looking directly at the image of the sending participant within the virtual environment 300. In this case, the importance of the sending participant 310 could be judged differently for each receiving participant.

In another embodiment, valuing an importance of the sending participant is based on how close to the center of a monitoring device of the receiving participant is the sending participant displayed. A receiving participant might orient his or her view to put the participant of greatest interest in the center of his or her display. Thus, importance could be judged as a function of the distance from the center of the display. The sending participant's importance could be judged differently by each receiving participant.

In another embodiment, valuing an importance of the sending participant, is based on whether the sending participant is speaking. In this case, the most important participant could be judged to the participant who is speaking. Audio could be sensed to determine which participant in the N-way collaborative session is speaking.

In still another embodiment, the resolution of display devices varies. In this case, there is no reason to render a higher resolution image than can be displayed by the receiving participants. As a result, the display capabilities of the receiving participants is considered when deciding the resolution at which to render the sending participant.

In one embodiment, for each receiving participant, resolution of the video image data stream may be generated based on all three factors previously discussed: based on the importance of the sending participant, distance between the sending and receiving participants in the virtual environment, and a resolution of display monitors associated with the receiving participants. All of these factors are combined to determine the desired resolution at each receiving node individually. Then, the desired resolutions are tested to define the clusters. Furthermore, the desired resolutions can be averaged, or a median of the desired resolutions is calculated, to determine the resolution of the common data stream, once the clustering is determined.

If multiple users require approximately the same resolutions and also have similar requirements among other parameters that might be in use, then those multiple users can share the same video image stream of a sending participant. These multiple users are defined as the cluster of receiving participants. This resolution reduction can be seen as a form of spatial clustering and saves rendering expense since the renderings of the sending participants produced for distant receiving participants will have fewer pixels and scan lines.

Figure 4:
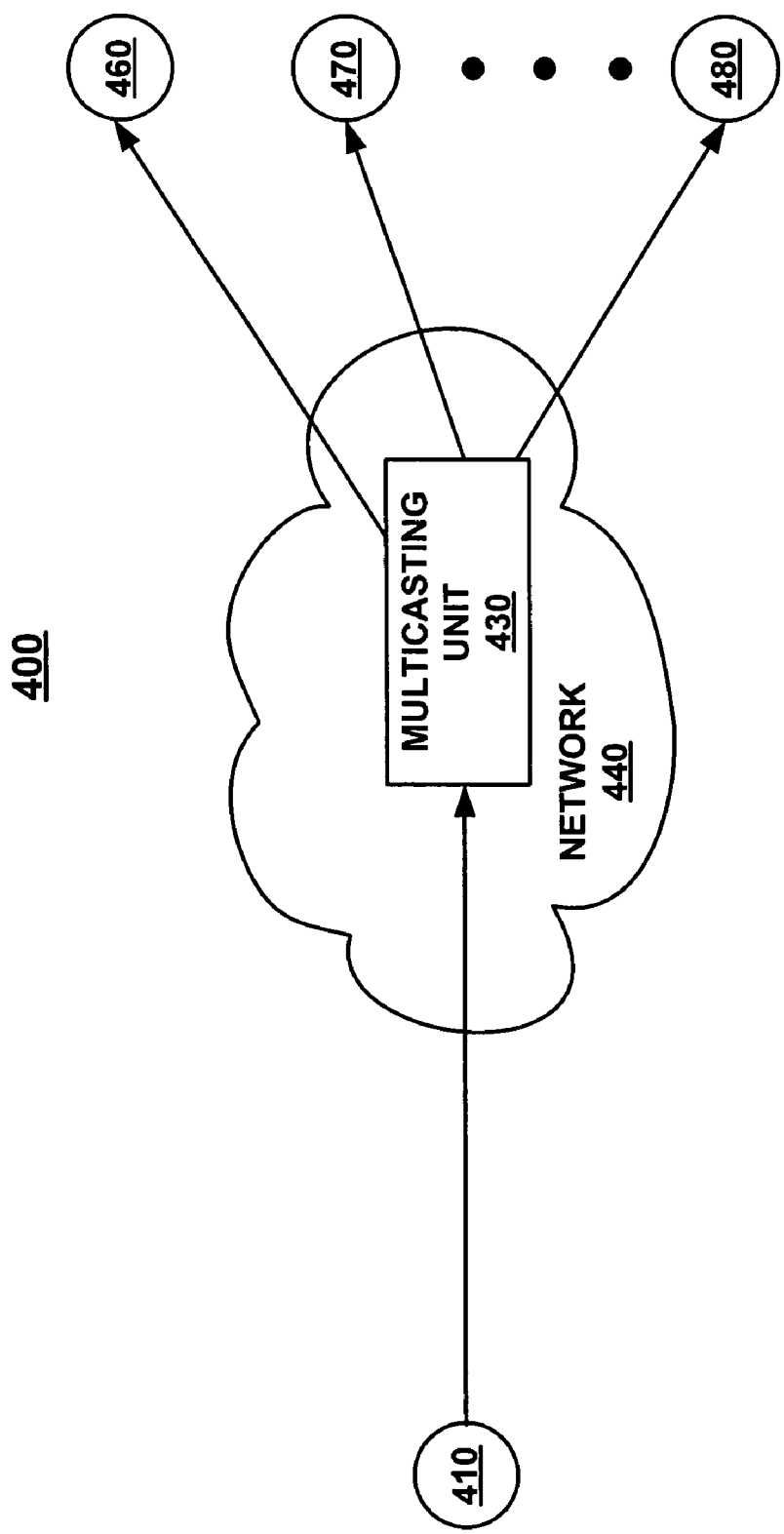
FIG. 4 is a diagram of an exemplary communication network supporting an N-way collaborative virtual environment that implements multicasting, in accordance with one embodiment of the present invention.

FIG. 4 is a diagram of a communication network 400 illustrating communication bandwidth savings, in accordance with one embodiment of the present invention. Clustering data streams and multicasting saves communication costs in the following manner. Clustering allows multiple receivers to receive the same data stream, where otherwise they would receive different data streams, as described previously. Multicasting reduces communication cost when multiple receivers receive the same data stream. The present embodiment is capable of reducing the communication traffic from the sending participant 410 to one or more receiving participants (e.g., 460, 470 on up to 480).

Multicasting is an important approach to enable scalability, and occurs when multiple users can share the same content. As such, one version of the content is sent to collaborators who are sharing the content. As a result, multicasting the common data stream provides for communication efficiency.

Multicasting provides for sending the common data stream through the network 400 primarily as one data stream. This is an important approach to enable scalability of the N-way collaboration virtual environment that is supported by the communication network 400. In one embodiment, the common data stream is sent from the sending participant 410 over the communication network as one signal through a network 440 (e.g., the Internet) to a multicasting unit 430. The multicasting unit 430 is capable of reproducing and sending the common data stream to each of the receiving participants 460, 470, up to 480.

In the present embodiment, the sending participant 410 is capable of sending the same data stream to the receiving participants 460, 470, up to 480 by multicasting. As described previously, clustering is accomplished by combining similar data streams normally generated for each of a cluster of receiving participants into one common data stream. The common data stream can then be transmitted in a multicast format to the receiving participants 460, 470, up to 480.

Communication efficiency increases the closer the multicasting unit 430 is positioned to the ends of the communication paths between the sending participant 410 and the receiving participants 460, 470, up to 480. That is, less communication traffic is sent over the communication network 400 when the multicasting unit 430 is positioned close to the receiving participants 460, 470, up to 480 in the network 400.

In a collaborative virtual environment, a representation of each object might be sent, as a video stream, to each other object. The data streams might be parameterized by tow parameters viewpoint and resolution. Table 1 is a summary of video image streams of an object, Tom, that are sent throughout the N-way collaborative environment. If some receivers have parameter values that satisfy a condition indicating that they receive similar video streams, then those receivers can be defined to be a cluster of and they can be sent the same video streams. If multicasting is available, the shared video streams can be multicast to the receivers.

TABLE 1

| Tom viewpoint 1 | High Resolution |
| Tom viewpoint 2 | High Resolution |
| Tom viewpoint 3 | Medium Resolution |
| Tom viewpoint 4 | High Resolution |
| Tom viewpoint 4 | Low Resolution |

Table 1 lists the object Tom in 5 versions. That is, the object, Tom, may be sent as 5 multicast video image signals. The 5 multicast signals represent four different viewpoints of the objet Tom, and also three different resolutions. Note that the viewpoint 4 is sent in two different streams, with both high and low resolutions. As such, each receiver, or viewing collaborator can select which objects/viewpoints variation to receive, and then compose these objects to form the final scene in the N-way collaborative environment.

In one embodiment, the multicast may be achieved via any communication protocol that supports multicasting, or via an application-layer multicast via an overlay network, in another embodiment.

Figure 5:
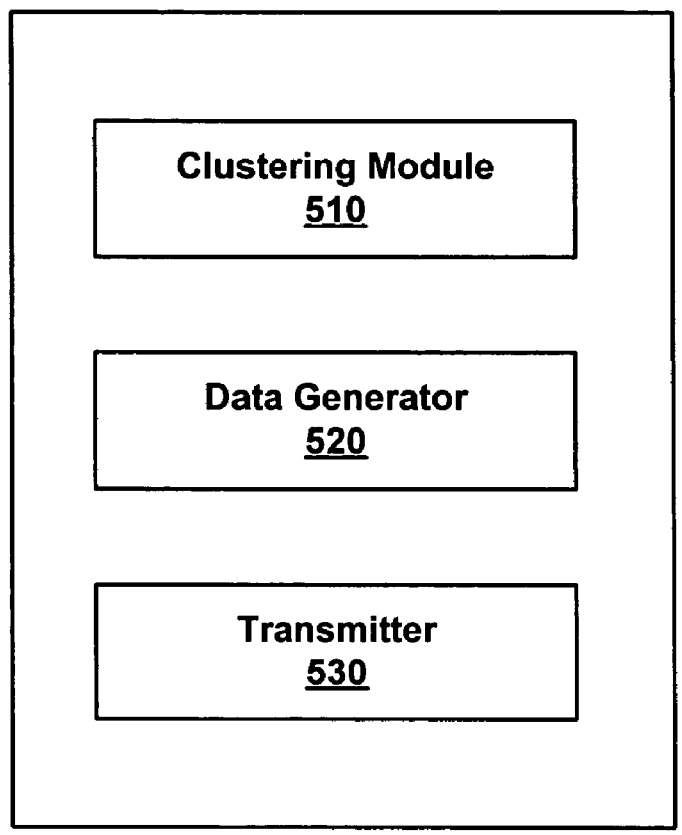
FIG. 5 is a block diagram of a system that is capable of clustering view dependent video communication within an N-way collaborative environment, in accordance with one embodiment of the present invention.

FIG. 5 is a block diagram of a system 500 that is capable of clustering data streams for an N-way collaborative environment, in accordance with one embodiment of the present invention. The system 500 is comprised of a clustering module 510, a data generator 520, and a transmitter 530.

The clustering module 510 determines a cluster of receiving participants in a virtual environment. Each of the cluster of receiving participants is associated with at least one clustering parameter that satisfies a test. The data generator 520 generates a common data stream based on the clustering parameter. In addition, the system 500 comprises a transmitter 530 that sends the common data stream from a sending participant to the cluster of receiving participants.

The preferred embodiments of the present invention, a method and system for clustering data streams for use in a virtual environment, is thus described. While the present invention has been described in particular embodiments, it should be appreciated that the present invention should not be construed as limited by such embodiments, but rather construed according to the below claims.

What is claimed is:

1. A method for clustering data in a virtual environment, comprising:
   determining a cluster of receiving nodes in said virtual environment, wherein each of said cluster of receiving nodes have associated values for at least one clustering parameter that as a set satisfies a test;
   generating a common data stream based on said at least one clustering parameter;
   generating a common video image stream as said common data stream of an object associated with said sending node using a new view synthesis technique, wherein said common video image stream is rendered from a common perspective in said virtual environment that is associated with said cluster of receiving nodes wherein said common perspective is calculated from an average of said at least one clustering parameter;
   generating a three-dimensional model of said object to which said new view synthesis technique is applied to generate said common video image stream; and
   sending said common data stream from a sending node to said cluster of receiving nodes.

2. The method of claim 1, wherein data streams associated with said cluster of receiving nodes are substantially similar.

3. The method of claim 1, wherein said sending said common data stream further comprises:
   multicasting said common data stream from said sending node over a communication network to said cluster of receiving nodes to achieve communication network traffic efficiency.

4. The method of claim 1, wherein said at least one clustering parameter comprises a view dependent clustering parameter that defines an associated perspective of a receiving node within said virtual environment, wherein each of said cluster of receiving nodes is spatially located in said virtual environment, such that their respective perspectives are similar resulting in said clustering parameter that is shared.

5. The method of claim 1, wherein said at least one clustering parameter comprises a temporal clustering parameter, wherein each of said cluster of receiving nodes require substantially the same frame rate, such that their respective data quality requirements are similar.

6. The method of claim 1, wherein said at least one clustering parameter comprises a spatial clustering parameter, wherein each of said cluster of receiving nodes require substantially the same resolution parameter value, such that their respective data resolution requirements are similar.

7. The method of claim 6, further comprising:
   limiting resolution of said common data stream based on resolution capabilities of display devices associated with said cluster of receiving nodes.

8. The method of claim 6, further comprising:
increasing a resolution parameter value of a receiving node as said sending node becomes more important to said receiving node in said virtual environment; and
decreasing said resolution parameter value as said sending node becomes less important to said receiving node in said virtual environment.

9. The method of claim 8, further comprising:
valuing an importance of said sending node based on whether a receiving node is gazing at a representation of said sending node in said virtual environment.

10. The method of claim 8, further comprising:
valuing an importance of said sending node based on how close to a center of a monitoring device associated with said receiving node is a representation of said sending node displayed.

11. The method of claim 8, further comprising:
valuing an importance of said sending node based on whether said sending node is speaking.

12. The method of claim 1, wherein said determining a cluster of receiving nodes further comprises:
dynamically changing said test for determining said cluster of receiving nodes in said virtual environment in response to changing conditions for computational resources in a communication network supporting said virtual environment and said cluster of receiving nodes.

13. A system for clustering data in a virtual environment, comprising:
a clustering module for determining a cluster of receiving nodes in said virtual environment, wherein each of said cluster of receiving nodes have associated values for at least one clustering parameter that as a set satisfies a test;
a data generator for generating a common data stream based on said at least one clustering parameter;
a common video image stream generator for generating a common video image stream as said common data stream of an object associated with a sending node using a new view synthesis technique, wherein said common video image stream is rendered from a common perspective in said virtual environment that is associated with said cluster of receiving nodes wherein said common perspective is calculated from an average of said at least one clustering parameter;
a three dimensional model generator for generating a three-dimensional model of said object to which said new view synthesis technique is applied to generate said common video image stream; and
a transmitter for sending said common data stream from a sending node to said cluster of receiving nodes.

14. The system of claim 13, wherein said at least one clustering parameter comprises a view dependent clustering parameter, wherein each of said cluster of receiving nodes is spatially located in said virtual environment, such that their respective perspectives are substantially similar.

15. The system of claim 13, wherein said at least one clustering parameter comprises a temporal clustering parameter, wherein each of said cluster of receiving nodes require substantially the same frame rate, such that their data quality requirements are substantially similar.

16. The system of claim 15, wherein said frame rate is increased as said cluster of receiving nodes is located closer to said sending node in said virtual environment.

17. The system of claim 13, wherein said at least one clustering parameter comprises a spatial clustering parameter, wherein each of said cluster of receiving nodes require substantially the same resolution, such that their respective data quality requirements are substantially similar.

18. The system of claim 17, wherein said resolution is dependent on a value of importance said sending node is to a receiving node, such that higher values of importance are associated with higher resolution.

19. The system of claim 13, wherein said virtual environment comprises an N-way virtual collaborative environment.

20. A computer readable storage medium containing executable instructions which, when executed in a processing system, causes the system to perform the steps for clustering data in a virtual environment, comprising:
determining a cluster of receiving nodes in said virtual environment, wherein each of said cluster of receiving nodes have associated values for at least one clustering parameter that as a set satisfies a test;
generating a common data stream based on said at least one clustering parameter;
generating a common video image stream as said common data stream of an object associated with said sending node using a new view synthesis technique, wherein said common video image stream is rendered from a common perspective in said virtual environment that is associated with said cluster of receiving nodes wherein said common perspective is calculated from an average of said at least one clustering parameter;
generating a three-dimensional model of said object to which said new view synthesis technique is applied to generate said common video image stream; and
sending said common data stream from a sending node to said cluster of receiving nodes.

21. The computer readable storage medium of claim 20, wherein data streams associated with said cluster of receiving nodes are substantially similar.

22. The computer readable storage medium of claim 20, wherein said sending said common data stream in said method further comprises:
multicasting said common data stream from said sending node over a communication network to said cluster of receiving nodes to achieve communication network traffic efficiency.

23. The computer readable storage medium of claim 20, wherein said at least one clustering parameter comprises a view dependent clustering parameter that defines an associated perspective of a receiving node within said virtual environment, wherein each of said cluster of receiving nodes is spatially located in said virtual environment, such that their respective perspectives are similar resulting in said clustering parameter that is shared.

24. The computer readable storage medium of claim 20, wherein said at least one clustering parameter comprises a temporal clustering parameter, wherein each of said cluster of receiving nodes require substantially the same frame rate, such that their respective data quality requirements are similar.

25. The computer readable storage medium of claim 20, wherein said at least one clustering parameter comprises a spatial clustering parameter, wherein each of said cluster of receiving nodes require substantially the same resolution, such that their respective data resolution requirements are similar.

26. The computer readable storage medium of claim 25, wherein said method further comprises:
limiting resolution of said common data stream based on resolution capabilities of display devices associated with said cluster of receiving nodes.

27. The computer readable storage medium of claim 25, wherein said method further comprises:
  increasing a resolution parameter value of a receiving node as said sending node becomes more important to said receiving node in said virtual environment; and
  decreasing said resolution parameter value as said sending node becomes less important to said receiving node in said virtual environment.

28. The computer readable storage medium of claim 27, wherein said method further comprises:
  valuing an importance of said sending node based on whether a receiving node is gazing at a representation of said sending node in said virtual environment.

29. The computer readable storage medium of claim 27, wherein said method further comprises:
  valuing an importance of said sending node based on how close to a center of a monitoring device associated with said receiving node is a representation of said sending node displayed.

30. The computer readable storage medium of claim 27, wherein said method further comprises:
  valuing an importance of said sending node based on whether said sending node is speaking.

31. The computer readable storage medium of claim 20, wherein said determining a cluster of receiving nodes in said method further comprises:
  dynamically changing said test for determining said cluster of receiving nodes in said virtual environment in response to changing conditions for computational resources in a communication network supporting said virtual environment and said cluster of receiving nodes.

* * * * *